United States Patent [19]

Bender et al.

[11] Patent Number: 5,614,595
[45] Date of Patent: Mar. 25, 1997

[54] POLYMERS BASED ON CONJUGATED DIENES

[75] Inventors: Dietmar Bender, Schifferstadt; Klaus Bronstert, Carlsberg; Helmut Mach, Heidelberg; Martin Fischer, Ludwigshafen, all of Germany

[73] Assignee: BASF Aktiengesellschaft, Ludwigshafen, Germany

[21] Appl. No.: 543,318

[22] Filed: Oct. 16, 1995

Related U.S. Application Data

[62] Division of Ser. No. 110,223, Aug. 23, 1993, Pat. No. 5,494,976.

[30] Foreign Application Priority Data

Aug. 25, 1992 [DE] Germany .............. 42 28 160.1

[51] Int. Cl.$^6$ ...................................... C08F 8/04
[52] U.S. Cl. ...................... 525/332.8; 525/332.4; 525/333.1; 525/333.2; 525/378; 525/379; 525/380; 525/382; 525/385; 525/338; 508/223; 508/225
[58] Field of Search .................. 525/332.8, 332.9, 525/333.1, 333.2

[56] References Cited

U.S. PATENT DOCUMENTS

| | | | |
|---|---|---|---|
| 4,269,626 | 5/1981 | Gorke et al. ............... | 525/333.2 |
| 4,469,829 | 9/1984 | Konietzny et al. ............. | 525/333.2 |
| 4,496,613 | 1/1985 | Zagefka et al. ............. | 525/333.2 |
| 4,668,733 | 5/1987 | Anzinger et al. ............. | 525/333.2 |

*Primary Examiner*—Bernard Lipman
*Attorney, Agent, or Firm*—Keil & Weinkauf

[57] ABSTRACT

Polymers Ia and Ib carrying functional groups and obtainable by

A) 1. hydrogenation of the olefinic double bonds of a polymer IIa comprising
   a) from 20 to 100% by weight of a conjugated diene,
   b) from 0 to 80% by weight of an aromatic vinyl compound, and
   c) from 0 to 20% by weight of further comonomers,
   to give the hydrogenated polymer IIb,
2. metallation of IIb using an organoalkali metal compound to give IIc,
3. reaction of IIc with a diaziridine III to give IId, and
4. hydrolysis or alcoholysis of IId to give Ia, or by B) 1. partial hydrogenation of IIa to give a partially hydrogenated polymer IIb',
2. epoxidation of the double bonds of IIb' to give IIe, and
3. reaction of IIe with a compound IV carrying functional groups, to give Ib, are suitable as viscosity index improvers for engine oils.

3 Claims, No Drawings

POLYMERS BASED ON CONJUGATED DIENES

This is a Division of application Ser. No. 08/110,223, filed Aug. 23, 1993 U.S. Pat. No. 5,494,976.

The present invention relates to novel polymers Ia and Ib based on conjugated dienes carrying functional groups and obtainable by A) 1. hydrogenation of all or some of the olefinic double bonds of a polymer IIa comprising
   a) from 20 to 100% by weight of a conjugated diene,
   b) from 0 to 80% by weight of an aromatic vinyl compound, and
   c) from 0 to 20% by weight of further comonomers,
   to give the hydrogenated polymer IIb,
   2. metallation of the polymer IIb using an organoalkali metal compound to a degree of metallation of from 0.01 to 12 mmol of alkali metal per gram of IIb, to give the metallated polymer IIc,
   3. reaction of the polymer IIc with a diaziridine III containing up to 20 carbon atoms, to give the polymer IId, and
   4. hydrolysis or alcoholysis of IId to give Ia, or by B) 1. partial hydrogenation of a polymer IIa to give a partially hydrogenated polymer IIb', with the proviso that IIb' still contains from 0.2 to 2 mmol of olefinic double bonds per gram of polymer,
   2. expoxidation of the double bonds of IIb' to give an epoxidized polymer IIe, with the proviso that IIe contains from 0.01 to 2 mmol of oxirane rings per gram of polymer, and
   3. reaction of the polymer IIe with ammonia, a primary amine having up to 12 carbon atoms, a secondary amine having up to 20 carbon atoms, a polyamine having up to 300 carbon atoms and up to 100 nitrogen atoms, an alkanolamine having up to 120 carbon atoms, up to 10 nitrogen atoms and up to 12 hydroxyl groups, a polyalcohol having up to 300 carbon atoms and up to 150 hydroxyl groups, or a polyether having up to 300 carbon atoms and up to 100 oxygen atoms (compound IV), to give Ib.

The present invention furthermore relates to a process for the preparation of these polymers, to the use thereof as viscosity index improvers for engine oils, and to the engine oils themselves.

The polymerization of dienes and in some cases aromatic vinyl compounds and further comonomers is disclosed in general terms in numerous forms. In addition to free-radical polymerization, anionic polymerization is a conventional preparation method. Polymers of this type are used, after hydrogenation of their olefinic double bonds, as viscosity index improvers in lubricants.

In addition, functional groups such as hydroxyl and amino groups can be inserted into these base polymers by polymer-analogous reactions, modifying the properties of the originally oil-soluble polymers. The additional polar groups mean that they also act as dispersants.

Since oil solubility and a dispersant action depends on the type and number of the polar groups, it is a general aim to prepare polymers which have both properties in a balanced ratio.

U.S. Pat. No. 4,145,298 discloses the polymer-analogous reaction of hydrogenated and metallated butadiene-styrene copolymers with ketones, aldehydes, nitriles and epoxides carrying dialkylamino groups as substituents. However, the dispersant action of these polymers is unsatisfactory.

Furthermore, EP-A 329 254 discloses the polymer-analogous reaction of hydrogenated and metallated butadiene-styrene copolymers with isocyanates and imines.

According to EP-A 211 395, metallated butadiene-styrene copolymers are reacted with diaziridines. The resultant products are highly suitable as viscosity index improvers for engine oils, but are unsatisfactory with respect to their stability in long-term operation. The situation is similar in the copolymers of DE-A 36 11 421, which are products of the reaction of metallated butadiene-styrene copolymers with Schiff bases.

It is an object of the present invention to provide novel polymers based on conjugated dienes and carrying functional groups which have a strong dispersant action at the same time as good oil-solubility and oxidation and thermal stability.

We have found that this object is achieved by the polymers Ia and Ib defined at the outset, by a process for their preparation, by their use as viscosity index improvers for engine oils and by the engine oils themselves.

Polymerization

The polymers Ia and Ib according to the invention comprise from 20 to 100% by weight, preferably from 40 to 100% by weight, of a conjugated diene (a).

In addition, they may also be built up from up to 80% by weight, preferably from 20 to 60% by weight, of an aromatic vinyl compound (b) and up to 20% by weight of further comonomers (c).

The base polymers built up from conjugated dienes contain, in particular, $C_4$- to $C_{20}$-dienes. Examples of suitable monomers (a) are 1,3-butadiene
2-methyl-1,3-butadiene (isoprene)
2-phenyl-1,3-butadiene
2,3-dimethyl-1,3-butadiene
1,3-pentadiene
1,3-hexadiene
4-ethyl-1,3-hexadiene and
3-butyl-1,3-octadiene, and mixtures thereof.

Preferred monomers are 1,3-butadiene, isoprene and 2,3-dimethyl-1,3-butadiene.

Suitable monomers (b) are
styrene
α-methylstyrene
p-methylstyrene
o- and m-methylstyrene
p-tert-butylstyrene
o,p-dimethylstyrene and
vinylnaphthalenes, and mixtures thereof.

Preference is given to styrene, α-methylstyrene and p-methylstyrene. It is also possible to use styrene and naphthalene derivatives which are substituted by higher alkyl radicals.

The further monomers (c) may be the following compounds:
ethylene
$C_3$- to $C_{20}$-α-olefins
non-conjugated diolefins having 5 to 20 carbon atoms
vinyl esters, such as vinyl acetate
vinyl ethers, such as methyl vinyl ether and isobutyl vinyl ether
methyl and ethyl vinyl ketone
vinylpyridines
vinylpyrrolidones
alkyl esters, aminoalkyl esters, amides and aminoalkylamides of acrylic and methacrylic acid other monomers which do not react significantly with alkali metals, and mixtures of the above monomers.

If the base polymers IIa are copolymers, both random polymers and block copolymers, as well as mixed forms of the two types, are possible.

The structure of the base polymers affect the properties of the polymeric products according to the invention. Random polymers are distinguished by high shear stability, but only cause a slight increase in the viscosity of engine oil. This viscosity-increasing action is also known as thickening. By contrast, block copolymers of comparable molecular weight have a greater thickening action, but lower shear stability.

Polymers having a star-shaped structure, which are extremely shear-stable, are also suitable.

Copolymers having the structure A-B, where A is diene and B is an aromatic vinyl unit, which are particularly preferred as base polymers are random butadiene-styrene copolymers, butadiene-styrene two-block copolymers and isoprene-styrene two-block copolymers.

The base polymers have a mean molecular weight (number average $\overline{M}_n$) of from 10000 to 1000000, preferably from 50000 to 600000.

The polymers IIa can be prepared by any known polymerization method (see, for example, W. R. Sorensen and T. W. Campbell, Präparative Methoden der Polymerchemie, Verlag Chemie, 1961).

Preference is given to anionic polymerization, forming "living polymers" (J. Appl. Polym. Sci. 22 (1978) 2007), since this gives polymers having a narrow molecular weight distribution.

The anionic polymerization is carried out, for example, using organoalkali metal initiators; alkyllithium compounds, such as sec-butyllithium and amyllithium, are particularly suitable. The initiator is used in an amount of from 0.05 to 10 mol, preferably from 0.1 to 2 mol/mol of monomer. The amount of initiator affects the chain length of the polymer in accordance with known laws, so that low initiator concentrations cause the formation of polymers of high molecular weight and high initiator concentrations cause the formation of polymers of low molecular weight.

The polymerization is carried out at from −100° to 200° C., preferably at from −20° to 150° C., generally in solution. Suitable solvents are inert liquids, such as aliphatic, cycloaliphatic and aromatic hydrocarbons, for example hexane, cyclohexane, methylcyclohexane, benzene and toluene, and mixtures thereof.

Furthermore, it is expedient to initially introduce vinylic monomers which themselves do not undergo homopolymerization, such as 1,1-diphenylethylene, in small amounts with the solvent. As is generally known, these monomers eliminate interfering impurities from the reaction mixture by copolymerization, evident from the color change.

In the case of anionic polymerization, the polymerization is terminated in a known manner, for example by adding water and alkanol, such as ethanol.

Hydrogenation

The hydrogenation of the polymers IIa is preferably carried out catalytically using hydrogen. Partial hydrogenation to give the polymers IIb' is carried out so that not more than 2 mmol of olefinic double bonds are present per gram of polymer.

The olefinic double bonds are hydrogenated by methods which are known in general terms.

The preferred hydrogenation catalysts are mixed catalysts comprising trialkylaluminum compounds and carboxylates and alcoholates of nickel, cobalt and iron. Typical mixed catalysts are trimethylaluminum/cobalt(II) acetylacetonate and triisobutylaluminum/nickel(II) acetylacetonate, the latter being preferred.

In general, the mixed catalysts are employed in a ratio between the trialkylaluminum compound and the compound of the metal from subgroup 8 of from 2:1 to 20:1, preferably from 2:1 to 10:1, the total amount of the catalyst being from 0.001 to 1% by weight, preferably 0.01 to 1% by weight, based on the amount of polymer employed.

The hydrogenation is usually carried out at from 20° to 200° C., preferably at from 60° to 200° C.; the reaction slows excessively below 20° C., and significant side reactions, such as hydrogenation of the aromatic double bonds, can be expected at above 200° C.

A suitable hydrogen pressure is from about 5 to 100 bar, a range of from about 5 to 50 bar being particularly advisable for practical purposes.

The hydrogenation is expediently carried out in inert organic solvents, such as hexane, cyclohexane and methylcyclohexane. In general, it is advisable to carry out hydrogenation in the solvent previously used for the polymerization.

Metallation

Processes for the metallation of unsaturated polymers and reaction of the resultant metallated polymers with reactive chemical compounds are known in general terms and are described, for example, in U.S. Pat. No. 3,781,260, U.S. Pat. No. 3,976,628 and FR-A 2 437 417.

U.S. Pat. No. 4,145,298 discloses that hydrogenated polymers can be metallated so that randomly distributed reactive carbanionic centers are formed along the polymer chain.

In the process according to the invention, the metallation of the hydrogenated polymers IIb is expediently carried out using organoalkali metal compounds, preferably lithium compounds. It is furthermore particularly advantageous here to additionally use complexing agents.

Suitable organolithium compounds are bases, such as methyllithium, ethyllithium, propyllithium, n-butyllithium, sec-butyllithium, tert-butyllithium and benzyllithium.

Complexing agents which can be employed are tertiary amines and metal alkoxides.

Examples of tertiary amines are
tetramethylethylenediamine,
tetraethylethylenediamine,
tetradecylethylenediamine and
tetraoctylhexylenediamine.

Also suitable are tetramethyl-1,2- and tetramethyl-1,4-diaminocyclohexane. Particular preference is given to N,N,N',N'-tetramethylethylenediamine.

Suitable metal alkoxides are alcoholates of alkali metals, such as methanolates, ethanolates, propanolates, sec- and tert-butanolates, butenolates, hexenolates, phenolates and phenylphenolates. Examples of alkali metals are sodium and potassium. In the process according to the invention, potassium sec- and tert-butanolate are particularly suitable, the use of potassium tert-butanolate being particularly recommended.

In order to achieve the desired degree of metallation, from 0.01 to 12 mmol, preferably from 0.05 to 10 mmol, of the organoalkali metal compound are employed per g of polymer IIb, so that on average from 1 to 1200 carbanionic centers are formed per gram of polymer if conversion is complete. The molar ratio between the organoalkali metal compound and the complexing agent varies from 0.05 to 10, a molar ratio of from 0.1 to 2 being particularly preferred if tertiary amines are used and a molar ratio of from 0.2 to 2 being particularly preferred if alkali metal alkoxides are used.

In general, the metallation is carried out under a nitrogen atmosphere in an inert solvent, such as the saturated hydrocarbons hexane and cyclohexane. The solvent:polymer ratio by weight can vary from 1 to 20.

The metallation can be carried out at from 0° to 100° C., preferably from 25° to 75° C. The thermal stability of the organoalkali metal compounds is no longer ensured at higher temperatures, and the metallation rate drops at lower temperatures.

In general, the metallation proceeds over a period of up to 24 hours, but in most cases shorter reaction times of from one minute to two hours are sufficient.

Amination

The next step in the process according to the invention is reaction of the metallated polymers IIc with a diaziridine III to give the polymers IId.

The diaziridine III contains up to 20 carbon atoms and may be substituted on the carbon by aliphatic radicals, which may be bonded to one another, and on the nitrogen by aromatic or aliphatic radicals, which may be bonded to one another.

In addition to diaziridine itself, the following derivatives derived from the parent compound are suitable as compound III:

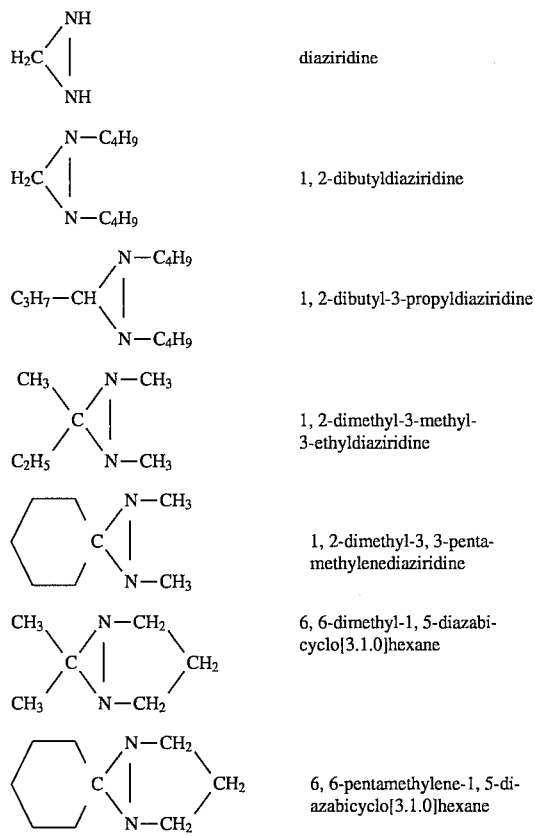

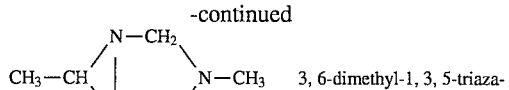

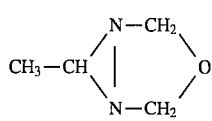 3, 6-dimethyl-1, 3, 5-triazabicyclo[3.1.0]hexane

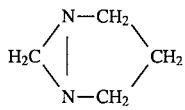 6-methyl-3-oxa-1, 5-diazabicyclo[3.1.0]hexane

A very particularly suitable diaziridine is 1,5-diazabicyclo[3.1.0]hexane

Further individual compounds and the preparation of compounds of this type are known and are described, for example in Chemische Berichte, 97 (1964) 39, and 99 (1966) 2104.

In general, the amount of diaziridine III employed is from 0.01 to 60 mmol, preferably from 0.01 to 20 mmol, per g of polymer, which corresponds to a ratio between the amino groups to be introduced and the carbanionic centers from 1:1 to 5:1, preferably from 1:1 to 2:1. Greater excesses of diaziridine III serve to accelerate the reaction and are generally not necessary.

The reaction of the metallated polymers IIc with a diaziridine III is preferably carried out at from −10 to 100° C., since the reaction is too slow at below −10° C., and undesired side reactions can increase at above 100° C.

The reaction of the polymers IIc with III is generally carried out in the presence of inert nonpolar solvents, such as hexane, cyclohexane, toluene or benzene.

The amount of solvent used is from about 1 to 20 kg per kg of polymer.

The reaction is expediently carried out under an inert atmosphere, for example under nitrogen. The reaction takes place quantitatively and proceeds at a fast rate, so that it is usually complete after only from 1 to 20 minutes.

Hydrolysis or Alcoholysis

In the final step of the process according to the invention, hydrolysis or alcoholysis of IId is carried out to give Ia. Alcoholysis using methanol or ethanol is particularly advantageous; however, other aliphatic alcohols, preferably $C_3$–$C_4$-alkanols, can also be used.

If water or alcohol is used in an amount equivalent to the alkali metal, the metal, for example lithium, is replaced by hydrogen, forming lithium hydroxide or lithium alcoholate.

If water or alcohol is used in excess, which is the preferred embodiment, polymers Ia containing primary or secondary amino groups are formed, depending on the diaziridine III reacted.

Overall, amination and hydrolysis or alcoholysis can be described as follows:
a) Amination using a diazabicycloalkane as III a) Amination using a diazabicycloalkane as III -continued $$-\overset{\ominus}{\underset{Li^{\oplus}}{CH}}- + N\overset{CH_2}{\diagup\diagdown}N- \longrightarrow -CH- \underset{\begin{subarray}{c}|\\ N\\ \diagup\diagdown\\ -N_{\ominus}\ \ CH_2\end{subarray}}{} \xrightarrow{1H_2O} -CH- \underset{\begin{subarray}{c}|\\ N\\ \diagup\diagdown\\ NH\ \ CH_2\end{subarray}}{}$$

$$Li^{\oplus}$$

IIc     III     IId     Ia

↓ xH₂O $$-CH- + CH_2O$$
$$\underset{HN\ \ \ \ NH_2}{|}$$

Ia b) Amination using a 1, 2-dialkyldiaziridine as III $$-\overset{\ominus}{\underset{Li^{\oplus}}{CH}}- + N\overset{CH_2}{\underset{|\ \ \ \ \ \ \ |}{\diagup\diagdown}}N- \longrightarrow$$
$$\ \ \ \ \ \ \ \ \ \ \ \ \ \ \ R'\ \ \ R'$$

IIc     III $$\underset{R'-N-CH_2-\underline{N}_{\ominus}-R'}{-CH-} \xrightarrow{1H_2O} \underset{R'-N-CH_2-NH-R'}{-CH-}$$
$$\ \ \ \ \ \ \ \ \ \ \ \ Li^{\oplus}$$

IId     Ia

↓ xH₂O $$\underset{R'-NH}{-CH-} + H_2N-R' + CH_2O$$

Ia

R' = alkyl

Epoxidation

In a further embodiment of the process according to the invention, polymers Ib carrying functional groups are prepared by epoxidation of partially hydrogenated polymers IIb' to give IIe and subsequent reaction thereof with a compound IV carrying functional groups.

Suitable peroxy compounds for the epoxidation reaction are in general those described in Houben-Weyl, Methoden der organischen Chemie, Volume 4/1a (1981) 184 ff and Volume 6/3 (1981) 385 ff. The following peroxidic compounds are suitable: ethyl peroxide, isopropyl peroxide, isobutyl peroxide, tert-butyl peroxide and benzyl peroxide.

Preferred compounds are peroxides of low boiling point, since they can be separated from the epoxidized polymer IIe by distillation under reduced pressure. Particular preference is given to tert-butyl peroxide.

The amount of epoxidation agent depends on the content of olefinic double bonds in the polymer IIb', the desired degree of epoxidation and the molecular weight of the polymer. It is advantageous to set the degree of epoxidation so that IIe contains from 0.01 to 2 mmol, preferably from 0.02 to 1.5 mmol, of oxirane rings per gram of polymer, allowing from 0.01 to 2 mol, preferably from 0.02 to 1.5 mol, of the compound IV to be bonded in the next reaction step. In general, the epoxidation agent is employed in a multiple excess to the desired degree of epoxidation and thus to the olefinic double bonds of IIb' still present. Excess epoxidation agent can be removed by distillation after the reaction.

In the epoxidation, epoxidation catalysts are expediently also used; these are generally vanadium, molybdenum and tungsten compounds. Preference is given to molybdenum trioxide. They are generally employed in an amount of from 0.005 to 50 mmol per gram of IIb'.

In general, inert organic solvents serve as the reaction medium. Preference is given to hydrocarbons such as toluene, benzene, cyclohexane and methylcyclohexane. The solvent:polymer weight ratio can be from 1 to 20.

The epoxidation is expediently carried out under a protective-gas atmosphere at from 0° to 120° C., preferably at from 25° to 75° C.

Reaction with Compounds Carrying Functional Groups

In order to introduce the functional groups, the epoxidized polymers IIe are reacted with a compound IV. Examples of suitable compounds IV are the following:

ammonia
primary and secondary amines having up to 20 carbon atoms, for example
   butylamine
   tributylamine
   dipentylamine
polyamines having up to 300 carbon atoms and up to 100 nitrogen atoms, for example
   ethylisopropylamine
   1,2-ethanediamine
   1,3-propanediamine
   1,4-butanediamine
   ethylaminoethylamine
   2-dimethylaminoethylamine
   2-diisopropylaminoethylamine
   N,N'-dimethylethylenediamine
   N,N'-di-tert-butylethylenediamine
   N,N'-dimethyl-1,3-propanediamine
   diethylenetriamine
   dipropylenetriamine
   N,N-dimethyldipropylenetriamine
   triethylenetetramine
   polyethyleneimine
alkanolamines having up to 120 carbon atoms, up to 10 nitrogen atoms and up to 12 hydroxyl groups, for example
   mono-, di- and triethanolamine
   methyl- and dimethylethanolamine
   ethyl- and diethylethanolamine
   propyl- and dipropylethanolamine
   methylisopropanolamine
   ethylisopropanolamine
   6-amino-1-hexanol
   mono-, di-, tri- and tetraethanolhexamethylenediamine mono-, di-, tri- and tetraisopropanolhexamethylenediamine mono-, di-, tri-, tetra- and pentaethanoldiethylenetriamine mono-, di-, tri-, tetra- and pentaisopropanoldiethylenetriamine mono-, di-, tri-, tetra-, penta- and hexaethanoltriethylenetetramine mono-, di-, tri-, tetra-, penta- and hexaisopropanoltriethylenetetramine 3-diethylamine-1,2-propanediol 3-(2-hydroxyethylamine)propanol dimethylaminodiglycol polyalcohols having up to 300 carbon atoms and up to 150 hydroxyl groups, for example 1,2-butanediol 1,2-pentanediol 1,5-pentanediol 1,6-hexanediol 2-butyl-2-ethyl-1,3-propanediol glycerol 1,2,4-butanetriol 2-methyl-2-hydroxymethyl-1,3-propanediol 2-ethyl-2-hydroxymethyl-1,3-propanediol 1,2,3,4-butanetetraol pentaerythritol polyvinyl alcohol polyethers having up to 300 carbon atoms and up to 100 oxygen atoms, for example polyethylene oxide and polypropylene oxide.

Preferred compounds IV are mono-, di-, tri-, tetra- and pentaethanoldiethylenetriamine, mono-, di-, tri-, tetra- and pentaisopropanoldiethylenetriamine, mono-, di-, tri-, tetra-, penta- and hexaethanoltriethylenetetramine and mono-, di-, tri-, tetra-, penta- and hexaisopropanoltriethylenetetramine, and in particular diethylenetriamine.

In order to achieve complete conversion, the compound IV is employed in a 2- to 10-fold excess, based on the reactive centers of the respective epoxidized copolymer. The excess compound IV can be removed from the polymer solution in a conventional manner.

For the preparation of the polymers Ib according to the invention, the epoxidized polymer IIe and the compound IV are heated in an inert solvent, advantageously in an aromatic or aliphatic hydrocarbon.

It is advisable to carry out the reaction at from 50° to 200° C., preferably from 80° to 160° C. The reaction duration depends on the reactivity of the starting components and can vary from 0.1 to 40 hours.

The polymers Ia and Ib according to the invention are preferably used as dispersant viscosity index improvers for engine oils.

The novel polymers Ia and Ib have advantages over those of the prior art in that, as additives for engine oils, they increase the viscosity of these oils and simultaneously act as dispersants for oil-insoluble constituents.

The engine oils according to the invention contain from 0.1 to 10% by weight, preferably from 0.2 to 5% by weight, of the polymers Ia and Ib as viscosity index improvers.

EXAMPLES

In the examples below, the molecular weights of the respective polymers were determined by gel permeation chromatography. The stationary phases used were crosslinked polystyrene gels having a particle size of 5 μm and pore widths of 500, 1000 and 10,000 Å. The mobile phase used was tetrahydrofuran.

The calibration substances used were various polystyrenes having a narrow molecular weight distribution. In order to calculate the mean molecular weight (number average $\overline{M}_n$ and weight average $\overline{M}_w$), a GPC software system from Polymer Standards (Mainz, Germany) was used.

The double bond content was determined by iodometric titration using the Wijs method (Ind. Eng. Chem. 15 (1943) 453).

EXAMPLE 1

Preparation of a Random Butadiene-styrene Copolymer IIa/1

A mixture of 7700 ml of cyclohexane, 40 ml of tetrahydrofuran, 480 g (8.9 mol) of butadiene and 520 g (5 mol) of styrene were charged under nitrogen, and 0.3 g (5 mmol) of sec-butyllithium was added at 30° C. 10 ml of a 1 normal solution of sec-butyllithium in hexane (10 mmol) were subsequently added. After the mixture had been stirred for 10 minutes, a reaction temperature of about 123° had been reached. The polymer solution was cooled, and the polymerization was terminated by addition of 4 ml of water.

$\overline{M}_w$=170,000

$\overline{M}_n$=150,000

EXAMPLE 2

Preparation of a butadiene-styrene two-block copolymer IIa/2 having a 1,2-content of 57% and a styrene content of 25% by weight A mixture of 5000 ml of cyclohexane, 26 ml of tetrahydrofuran and 250 g (2.4 mol) of styrene was charged under nitrogen. Sufficient of a 0.2 molar solution of sec-butyllithium in hexane was then added at 50° C. with stirring until the reaction solution had become a pale yellow colour. 10 ml of a 1 normal solution of sec-butyllithium in hexane (10 mmol) were then added. The reaction mixture was stirred at 50° C. for one hour and then cooled to 30° C., and 750 g (13.9 mol) of butadiene were added. The remainder of the polymerization was carried out at 50° C. for one hour and at 60° C. for a further hour. The polymerization was finally terminated by addition of 0.5 ml of water.

$\overline{M}_w$=160,000

$\overline{M}_n$=143,000

EXAMPLE 3

Preparation of an Isoprene-styrene Two-block Copolymer IIa/3

A mixture of 5000 ml of cyclohexane and 1.1 ml of diphenylethylene was charged under nitrogen. Sufficient of a 0.2 molar solution of sec-butyllithium in hexane was added at 30° C. with stirring until the solution had become a pale yellow color. 10 ml of a 1 normal solution of sec-butyllithium in hexane (10 mmol) were added, followed by 750 g (11 mol) of isoprene. The mixture was stirred at 60° C. for one hour, and polymerized at 70° C. for a further hour. 250 g (2.4 mol) of styrene were then added, the mixture was stirred at 60° C. for 30 minutes, and the polymerization was terminated by addition of 0.5 ml of water.

$\overline{M}_w$=165,000

$\overline{M}_n$=154,000

EXAMPLE 4

Preparation of IIb/1, IIb/2 and IIb/3 by hydrogenation of the copolymers IIa/1, IIa/2 and IIa/3 respectively The copolymers prepared as described in Examples 1 to 3 were each hydrogenated over the course of 24 hours using 1.48 g (5.8 mmol) of nickel acetylacetonate and 34 ml of a 20% strength by weight solution of triisobutylaluminum in hexane (24 mmol) at 130° C. and a hydrogen pressure of 20 bar. The hydrogenation catalyst was destroyed by addition of 9 g of 30% strength by weight hydrogen peroxide, 100 ml of water and 5 ml of acetic acid. The hydrogenated copolymer was in each case then precipitated in ethanol.

EXAMPLE 5

Preparation of IIc/1, IIc/2 and IIc/3 by metallation of the hydrogenated copolymers IIb/1, IIb/2 and IIb/3 respectively In each case, 500 g of the hydrogenated copolymers prepared as described in Examples 1 to 3 and hydrogenated as shown in Example 4 were dissolved in 5000 ml of cyclohexane under nitrogen and 0.5 g of 1,1-diphenylethylene was added. Sufficient of a 1 normal solution of n-butyllithium in hexane was then added with stirring until the polymer solution had become a pale yellow color. 50 ml of a 1 normal solution of n-butyllithium in hexane (50 mmol) and 5.7 g (50 mmol) of potassium tert-butanolate were then added. The solution was stirred at 70° C. for 2 hours and cooled to 40° C.

The same result was achieved with the complexing agent N,N,N',N'-tetramethylethylenediamine, which was used in an amount of 17.5 g (150 mmol) instead of potassium tert-butanolate.

EXAMPLE 6

Preparation of Ia/1, Ia/2 and Ia/3 by amination of the metallated copolymers IIc/1, IIc/2 and IIc/3 respectively, followed by alcoholysis In each case, the polymer solutions prepared as described in Example 5 were treated with 14 ml of a 30% strength by weight solution of 1,5-diazabicyclo[3.1.0]hexane (60 mmol) in toluene. After the mixture had been stirred for one hour, the products were in each case precipitated in methanol.

EXAMPLE 7

Preparation of a hydrogenated and aminated butadiene-styrene two-block copolymer Ia/2 in one reaction step The unsaturated starting copolymer was prepared as described in Example 2. The copolymerization was terminated by adding 0.3 g of water to the polymer solution as a 5% strength by weight solution in tetrahydrofuran. After the mixture had been stirred for 5 minutes, 0.6 g (2.3 mmol) of nickel acetylacetonate and 13.6 ml of a 20% strength by weight solution of triisobutylaluminum in hexane (9.5 mmol) were added. The solution was then hydrogenated for 24 hours at 95° C. and a hydrogen pressure of 20 bar. After the hydrogen had escaped and the tetrahydrofuran had been removed by distillation, 100 ml of a 1 normal solution of n-butyllithium in hexane (100 mmol) and 11.4 g (100 mmol) potassium tert-butanolate were added under nitrogen, and the mixture was stirred at 70° C. for 2 hours. It was subsequently cooled to 40° C. and treated with 50 ml of a 3 molar solution of 1,5-diazabicyclo[3.1.0]hexane (150 mmol) in cyclohexane. After the mixture had been stirred for one hour, the product was precipitated in ethanol.

EXAMPLE 8

Preparation of Ib/1 by epoxidation of IIa/1 and reaction with IV 68 g of the hydrogenated copolymer IIa/1 from Example 1 were dissolved in 600 ml of toluene, and 2.4 g of a 48% strength by weight solution of tert-butyl peroxide in toluene and 100 mg of molybdenum trioxide were added. The resultant polymer solution was then reacted for 40 hours at 140° C. in a steel autoclave with 4.9 g (55 mmol) of diethylenetriamine and 0.8 g of acetic acid. The polymer solution was washed several times with water and evaporated, and the product was then precipitated from ethanol.

EXAMPLE 9

Preparation of Ib/3 by epoxidation of IIa/3 and reaction with IV 68 g of the hydrogenated copolymer from Example 3 were epoxidized and reacted with diethylenetriamine as described in Example 8.

EXAMPLE 10

Preparation of 1,5-diazabicyclo[3.1.0]hexane 100 g of a 30% strength by weight formaldehyde solution (1 mol) and 548 ml (1 mol) of an aqueous sodium hypochlorite solution were added with stirring at 45° C. to 74 g (1 mol) of 1,3-diaminopropane. After a reaction time of 1 hour, the crude product was allowed to cool and was extracted several times with chloroform. Distillative work-up gave the product in a yield of 95% and in a purity, measured by gas chromatography, of 95%. After a further distillation over a packed column, the product was obtained in a purity of 99%. B.p./2 mbar=42° C.

In order to check the quality of the polymers, the following properties were determined:
kinematic viscosity, in accordance with DIN 51 562
Viscosity index, in accordance with ISO 2909
shear stability index (SSI), in accordance with DIN 51 382
shear loss, in accordance with DIN 51 382

The kinematic viscosity $v$ (unit $mm^2/s$ or cSt) denotes a viscosity/density ratio and is defined as the quotient of the absolute viscosity $\eta$ and the density d of a liquid $$v = \eta/d$$

In order to obtain convenient numbers, the unit selected is the centistoke (1 cSt=$10^{-6}$ $m^2/s$). The viscosity:density ratio is attained by measuring the viscosity in a capillary viscometer under the action of the inherent weight of the liquid, the measurement being dependent on acceleration due to gravity.

The kinematic viscosity was determined on a 1.5% strength by weight solution of the polymer in SN 200 base oil at 40° C. and 100° C. in a capillary viscometer.

The viscosity index (VI) is a parameter from which the viscosity/temperature (VT) behavior of liquids such as lubricant oils is derived. From the kinematic viscosities N of the 1.5% strength by weight solutions of the polymer in an SN 200 base oil, the viscosity index (VI) was determined in accordance with ISO 2909.

The action of shear forces results in degradation of the polymer molecules added to the oils as viscosity index improvers and thus in a drop in the viscosity of the oil. The change in viscosity caused by shearing is known as the relative drop in viscosity or shear loss (unit %) and is determined from the absolute drop in kinematic viscosity ($v_0 - v_1$) and the kinematic viscosity of the unsheared oil $v_0$ in accordance with the relationship:

$$\Delta v = \frac{v_0 - v_1}{v_0} \cdot 100$$

$v_0$=kinematic viscosity of the unsheared oil at 100° C.
$v_1$=kinematic viscosity of the sheared oil at 100° C.

The shear loss was determined in accordance with DIN 51 382 by measuring the kinematic viscosity of a 1.5% strength by weight solution of the polymer in the SN 200 base oil. The test oil was passed 30 times through a diesel injection nozzle,, and the change in viscosity in the injected oil compared with the viscosity of the uninjected oil was determined as the permanent drop in viscosity.

The dispersant action of the polymers was assessed using the spot test (A. Schilling, Les Huiles pour Moteurs et le Graissage des Moteurs, Volume 1, page 84ff, 1962). A 15% strength by weight solution of the respective polymer in an unalloyed base oil was mixed with 5% by weight of an oil which had been charged with soot and other combustion residues in an engine test. In order to test the effect of water and heat on the dispersant action, each dispersion was subjected to four spot tests:
a) without addition of water
b) with addition of 1% by weight of water
c) heating for 10 minutes at 250° C. without addition of water
d) heating for 10 minutes at 250° C. with addition of 1% by weight of water.

For testing, the oily dispersions were applied to filter paper and developed for 24 hours like a chromatogram. The ratio (in percent) of the development radii of pure mobile phase (base oil) and dispersed soot gives an indication of the dispersant action of the polymer.

The results of the individual quality tests are shown in the table below. They show that the polymers according to the invention are excellent viscosity index improvers for engine oils and at the same time have an excellent dispersant action.

TABLE

Applicational properties of the polymers according to the invention

| Polymer prepared as described in Example | $\bar{M}_n$ (10³ g/mol) | Viscosity v at 40° C. (cSt) | Viscosity v at 100° C. (cSt) | Viscosity index VI | Shear loss % | SSI | Dispersant action ratio between development radii of soot to oil in % a) | b) | c) | d) |
|---|---|---|---|---|---|---|---|---|---|---|
| Ia/1 (Example 6) | 155 | 81 | 11.6 | 134 | 48 | 11 | 67.9 | 67.9 | 53.9 | 66.7 |
| Ia/2 (Example 6) | 145 | 170 | 22.9 | 163 | 34 | 50 | 66.7 | 64.0 | 47.1 | 39.4 |
| Ia/3 (Example 6) | 155 | 159 | 19.9 | 145 | 31 | 40 | 66.0 | 65.0 | 58.1 | 59.9 |
| Ia/2 (Example 7) | 150 | 163 | 20.2 | 144 | 36 | 55 | 71.8 | 69.0 | 47.3 | 45.2 |
| Ib/1 (Example 8) | 145 | 103 | 14.5 | 145 | 12.4 | 21 | 70.4 | 69.4 | 64.3 | 62.1 |
| Ib/3 (Example 9) | 150 | 148 | 20.2 | 158 | 25.5 | 39 | 70.3 | 74.6 | 49.3 | 47.3 | a) Oil dispersion without water
b) Oil dispersion with 1% by weight of water
c) Oil dispersion without water and with heating to 250° C.
d) Oil dispersion with 1% by weight of water and with heating to 250° C.

The shear stability index (SSI) was determined in accordance with DIN 51 382. It takes into account the viscosity of the base oil and is calculated in accordance with the relationship:

$$SSI = \frac{v_0 - v_1}{v_o - v_G} \cdot 100$$

$v_0$=kinematic viscosity of the unsheared oil at 100° C.
$v_1$=kinematic viscosity of the sheared oil at 100° C.
$v_b$=kinematic viscosity of the base oil at 100° C.

We claim:
1. A polymer Ib based on conjugated dienes, carrying functional groups and obtained by
   1. the partial hydrogenation of the olefinic double bonds of a polymer IIa having a mean molecular weight (number average $\bar{M}n$) of from 10,000 to 1,000,000 and comprising
      a) from 20 to 100% by weight of a conjugated diene,
      b) from 0 to 80% by weight of an aromatic vinyl compound, and
      c) from 0 to 20% by weight of further comonomers, to give a partially hydrogenated polymer IIb', with the proviso that IIb' still contains from 0.2 to 2 mmol of double bonds per gram of polymer, 2. epoxidation of the double bonds of IIb' to give an epoxidized polymer IIe, with the proviso that IIe contains from 0.01 to 2 mmol of oxirane rings per gram of polymer, and 3. reaction of the polymer IIe with ammonia, a primary amine having up to 12 carbon atoms, a secondary amine having up to 20 carbon atoms, a polyamine having up to 300 carbon atoms and up to 100 nitrogen atoms, an alkanolamine having up to 120 carbon atoms, up to 10 nitrogen atoms and up to 12 hydroxyl groups, a polyalcohol having up to 300 carbon atoms and up to 150 hydroxy groups, or a polyether having up to 300 carbon atoms and up to 200 oxygen atoms (compound IV), to give Ib.

2. A polymer as defined in claim 1, obtained by reacting the polymer IIe with mono-, di- or triethanolamine, mono-, di-, tri- or tetraethanolhexamethylenediamine, mono-, di-, tri- or tetraisopropanolhexamethylenediamine, diethylenetriamine, triethylenetetramine or tetraethylenepentamine as the compound IV.

3. An engine oil containing from 0.1 to 10% by weight of the polymer of claim 1.

* * * * *